US008881274B2

(12) United States Patent
Ahn et al.

(10) Patent No.: US 8,881,274 B2
(45) Date of Patent: Nov. 4, 2014

(54) METHOD FOR PROVIDING DATA TO A PERSONAL PORTABLE DEVICE VIA NETWORK AND A SYSTEM THEREOF

(71) Applicant: Intellectual Discovery Co, Ltc., Seoul (KR)

(72) Inventors: Sung Min Ahn, Seoul (KR); Wan Ho Jang, Anyang (KR); Woon Sang An, Osan (KR); Sang Hyun Lee, Seoul (KR)

(73) Assignee: Intellectual Discovery Co., Ltd., Seoul (KR)

( * ) Notice: Subject to any disclaimer, the term of this patent is extended or adjusted under 35 U.S.C. 154(b) by 0 days.

(21) Appl. No.: 14/079,903

(22) Filed: Nov. 14, 2013

(65) Prior Publication Data

US 2014/0075182 A1 Mar. 13, 2014

Related U.S. Application Data

(63) Continuation of application No. 11/659,162, filed as application No. PCT/KR2005/002611 on Aug. 11, 2005.

(30) Foreign Application Priority Data

Aug. 13, 2004 (KR) ........................ 10-2004-0063860

(51) Int. Cl.
*G06F 21/00* (2013.01)
*G06F 21/10* (2013.01)
*G06F 21/62* (2013.01)
*H04L 29/06* (2006.01)

(52) U.S. Cl.
CPC ............ *H04L 63/0464* (2013.01); *G06F 21/10* (2013.01); *G06F 2221/2107* (2013.01); *G06F 21/6236* (2013.01); *H04L 63/08* (2013.01); *H04L 63/10* (2013.01); *H04L 63/0428* (2013.01)
USPC ............... 726/22; 726/7; 726/28; 713/182; 380/30; 380/201

(58) Field of Classification Search
CPC .................................... H04L 63/0457
USPC ..................................... 726/7, 22
See application file for complete search history.

(56) References Cited

U.S. PATENT DOCUMENTS 5,729,825 A 3/1998 Kostreski et al.
6,363,357 B1 3/2002 Rosenberg et al.

(Continued)

FOREIGN PATENT DOCUMENTS

JP 07-296508 11/1995
JP 2002-176419 A 6/2002

(Continued)

OTHER PUBLICATIONS

International Search Report for PCT/KR2005/002611, ISA/KR, Daejeon, mailed Oct. 28, 2005.

(Continued)

*Primary Examiner* — Morshed Mehedi
(74) *Attorney, Agent, or Firm* — NSIP Law

(57) ABSTRACT

Disclosed are a method and a system for synchronizing and providing data requiring digital rights protection, to a portable device, wherein a contents providing server is connected with a contents synchronization server to which the portable device is connected.

18 Claims, 5 Drawing Sheets

(56) References Cited

U.S. PATENT DOCUMENTS

| | | |
|---|---|---|
| 6,842,604 B1 | 1/2005 | Cook et al. |
| 7,215,660 B2 | 5/2007 | Perlman |
| 7,471,665 B2 | 12/2008 | Perlman |
| 7,711,605 B1 | 5/2010 | Santeufemia et al. |
| 2003/0009770 A1 | 1/2003 | Tantawy et al. |
| 2003/0070174 A1 | 4/2003 | Solomon |
| 2003/0079133 A1* | 4/2003 | Breiter et al. .............. 713/182 |
| 2003/0121043 A1 | 6/2003 | Reinold et al. |
| 2003/0226143 A1 | 12/2003 | Michael et al. |
| 2004/0002359 A1 | 1/2004 | Deas et al. |
| 2004/0002904 A1 | 1/2004 | Deas et al. |
| 2004/0019801 A1* | 1/2004 | Lindholm et al. ........... 713/200 |
| 2004/0160928 A1* | 8/2004 | Perlman ....................... 370/338 |
| 2004/0167857 A1* | 8/2004 | Baker et al. .................. 705/51 |
| 2005/0216763 A1* | 9/2005 | Lee et al. ..................... 713/200 |
| 2006/0041905 A1* | 2/2006 | Wasilewski .................. 725/31 |
| 2006/0059566 A1* | 3/2006 | Rastas .......................... 726/27 |
| 2006/0107295 A1 | 5/2006 | Margis et al. |
| 2006/0161969 A1* | 7/2006 | Moreillon ..................... 726/3 |
| 2006/0242074 A1* | 10/2006 | Kokkinen ..................... 705/53 |
| 2007/0185878 A1* | 8/2007 | Fierstein et al. .............. 707/10 |
| 2007/0201511 A1* | 8/2007 | Saito et al. ................... 370/466 |

FOREIGN PATENT DOCUMENTS

| | | |
|---|---|---|
| JP | 2003-069595 A | 3/2003 |
| JP | 2005-514716 A | 5/2005 |
| KR | 2004-0001364 | 1/2004 |
| KR | 2004-0028086 Y1 | 4/2004 |
| WO | WO-01-80472 A2 | 10/2001 |
| WO | WO-03-036441 A2 | 5/2003 |
| WO | WO-03-058620 A2 | 7/2003 |
| WO | WO-2004-003810 A1 | 1/2004 |

OTHER PUBLICATIONS

Japanese Office Action for Application No. 2007-525544 dated Jan. 7, 2014 (25 pages).

* cited by examiner

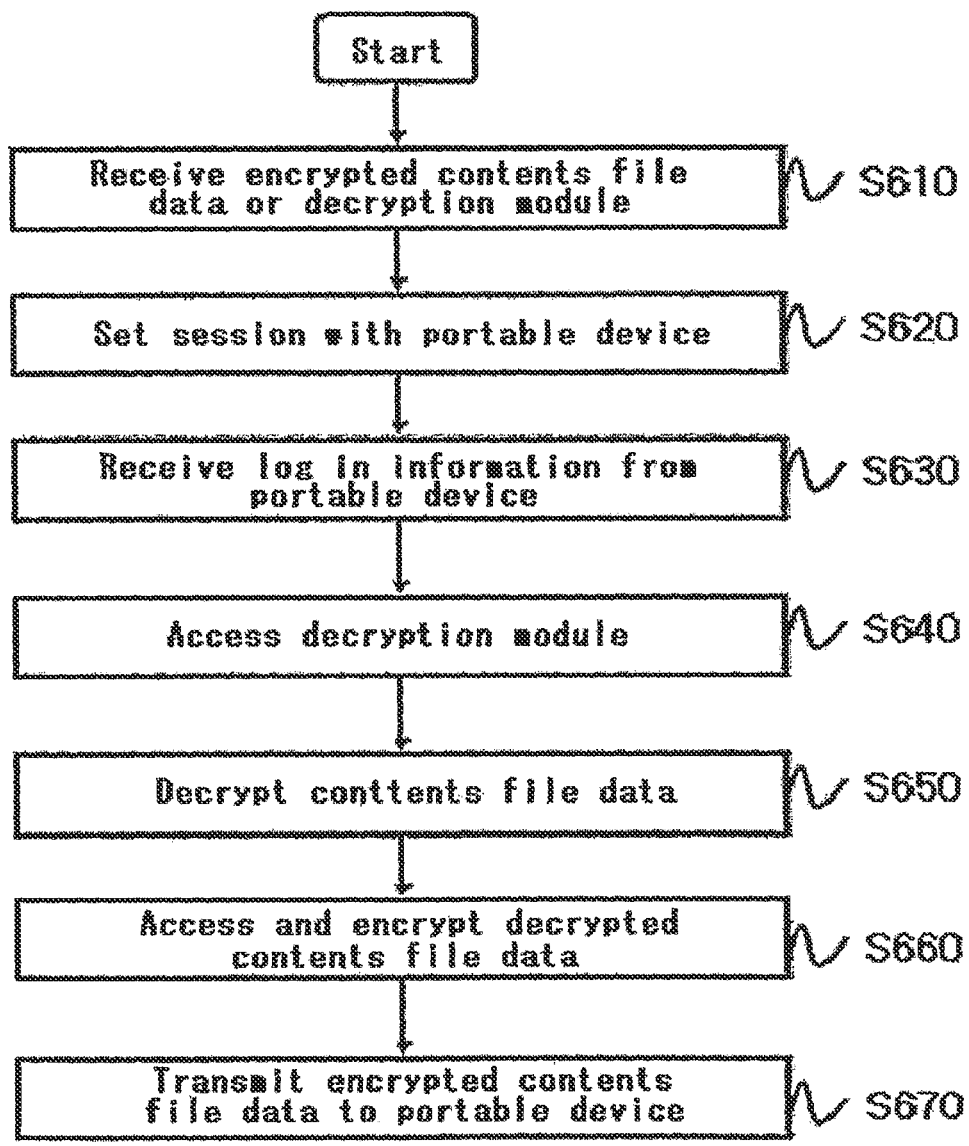

METHOD FOR PROVIDING DATA TO A PERSONAL PORTABLE DEVICE VIA NETWORK AND A SYSTEM THEREOF

CROSS-REFERENCE TO RELATED APPLICATIONS

This is a continuation application of U.S. application Ser. No. 11/659,162 filed Feb. 1, 2007, which is a national phase application of PCT/KR2005/002611 filed Aug. 11, 2005 which claims priority to Korean Patent Application No. 10-2004-0063860 filed Aug. 13, 2004 all of which are incorporated by reference herein in their entireties.

BACKGROUND OF THE INVENTION

1. Field of the Invention

The present invention relates to a method for providing data synchronized with a portable device to the portable device via a network and a system thereof. More specifically, the invention relates to a method and a system for synchronizing and providing data requiring digital rights protection, to a portable device, wherein a contents providing server is connected with a contents synchronization server to which the portable device is connected.

2. Description of the Related Art

A method for managing data recorded in a portable device such as an MP3 player, a PDA, a handheld personal computer (PC), a mobile communication device, etc, generally, includes a method of synchronizing data or files between a PC and the portable device. Such a method includes a method of connecting the PC to the portable device by using a wired method such as a serial port which is referred to as 'cradle synchronization', a universal serial bus (USB) port, etc, or a method of connecting the PC to the portable device by using a wireless method such as an infrared port, Wi-Fi, etc. Also, as for a method of transmitting data to the portable device, there is a USB mass storage method that recognizes the portable device connected through the USB or the like in a computer as one mass storage and transmits a file or data freely currently widely used. It is apparent to those skilled in the art that transmission of files or data using this USB mass storage method transmits only files or data simply, wherein there is not supported algorithm that can secure the transmitted file or data, or can protect digital rights thereof.

Various methods are being conceived to protect an owner's copyright. There is growing understanding that digital contents itself are copyright and should be protected. With this, it is also true that users who used to consider digital contents free of charge have started to change their attitudes. Methods of protecting digital contents rights are suggested as below.

A digital rights management (referred to as 'DRM' hereinafter) system is as one method for protecting digital contents rights. This DRM system is a kind of technology embodying a system which safely transmits various contents of a network from a contents provider (CP) to a client, and prevents the client from distributing the contents illegally. An encrypting technique is most important in the DRM system. This technique encrypts/decrypts digital contents using a client's password or computer ID number as key data. Therefore, although the digital contents are unlawful copied and distributed to a third person, he/she may use the digital contents only with the key data. A method of using this key data may include 1) a method of transforming a client's computer ID or 2) a method of using a client's public key infrastructure (PKI) key or a personal key cache.

FIG. 1 is a view illustrating a configuration of a conventional system for embodying a method for digital contents protection.

FIG. 1 is one example of a digital contents providing system using DRM. A DRM center 120 links digital contents providing server 110 with a payment gateway system 130 and provides copyright-protected digital contents to a user 140 after encrypting the same. When the user 140 requests use of digital contents such as image, audio, video, etc., through a network like Internet and pays a predetermined fee, the DRM center 120 provides the digital contents to the user 140 after encrypting the same according to a predetermined algorithm. Recently, disclosed is a tempering method that restores a source code of digital contents by using an execute-file that is encrypted and transmitted to the user. Accordingly, the DRM center 120 requires a technique for efficiently preventing a hacking technique like the tempering.

As described above, although various technologies are being developed for protecting digital various contents rights on Internet, the technologies are digital right protection methods that are performed by contents providers. Therefore, it is difficult to integrate and operate the technologies as one standard among various contents providers. In addition, an owner of digital contents may have his/her right infringed unjustly because digital right protection is weakened due to various methods such as the aforementioned tempering technique or the like.

Furthermore, the conventional method of protecting digital contents rights uses a different method for respective contents providing system. Therefore, a plurality of decryption modules may be mounted on a portable device in order to reproduce digital contents which are encrypted in various formats. On the contrary, if the number of decryption modules is limited to be mounted on the portable device, the number of digital contents which is unplayable may increase.

Moreover, if the number of contents providing systems increases, a user may remember as many user IDs and passwords as the number of contents providing systems in order to use the digital contents.

So as to solve the aforementioned problems in the prior art, there has been strong desire for a solution which not only can support digital contents, but also can manage channels of synchronizing data between a plurality of contents providing systems, wherein the digital contents are encrypted in various formats for using contents that require digital right protection.

In addition, like MP3 phone, satellite phone, W-CDMA phone having been widely used, a mobile multimedia communication terminal providing audio or image contents service, may access Internet over a mobile communication network and receive digital audio or image contents, without using a special personal computer. Like a method for providing contents to a portable device, also in a case of the mobile multimedia communication terminal, digital copyright protection is significantly required.

SUMMARY OF THE INVENTION

According to the present invention, a method for providing data synchronization with a portable device via a network and a system thereof is conceived to solve the aforementioned problems in the prior art. The present invention may provide a method of decrypting digital contents encrypted into various formats in a contents synchronization server and of transmitting the digital contents to a portable device.

Further, according to the present invention, the method for providing data synchronized with a portable device to the portable device via a network and a system thereof, decrypt digital contents encrypted into various formats in one contents synchronization server and transmit the digital encrypted contents to the portable device after encrypting the digital decrypted contents in a predetermined DRM method. In addition, the method and the system enable the portable device to reproduce the digital encrypted contents through one decryption module. Therefore, the present invention may protect digital right more strongly and support the DRM method of various formats.

Furthermore, according to the present invention, the method and the system enable at least one digital contents to be transmitted from at least one contents providing server if there is one-connection through one contents synchronization server. Therefore, the present invention can reduce the inconvenience of a user who should input a user ID and a password separately in the conventional contents providing systems and enable the user to receive digital contents that the user wants to use through one logic channel.

Moreover, in accordance with the present invention, the method and the system decrypt digital contents encrypted into various formats in one contents synchronization server, encrypt the digital decrypted contents so that the same may be usable only in a predetermined portable device, and transmit the digital encrypted contents to the portable device, wherein the portable device is enabled to play the digital encrypted contents through one decryption module. Consequently, the present invention may protect digital rights more strongly and support the DRM method of various formats.

In addition, in accordance with the present invention, the method and the system are accessible only when digital contents encrypted into various formats are decrypted in one contents synchronization server and the digital decrypted contents are encrypted. Accordingly, the present invention may prevent unauthorized copying of digital contents which may be caused by unauthorized access to the decrypted file data.

According to a first aspect of the present invention, there is provided a method for providing data to a portable device via a network, comprising the steps of: maintaining a user information database for recording user authentication information or user contents information, the user authentication information includes at least one among a user identification, a password, and the user's portable device identification, and the portable device identification has a unique value; receiving encrypted contents file data or a predetermined decryption module from a predetermined contents providing server, the decryption module is a module that decrypts the encrypted contents data corresponding to an encryption manner of the contents providing server; controlling an access to a predetermined decryption module; decrypting the encrypted contents file data through the accessed decryption module; receiving user authentication information or contents to transmission request information from a predetermined portable device, the contents transmission request information includes predetermined user information and contents information that a user requested; authenticating a user corresponding to the user authentication information with reference to the user information database; searching contents detail information corresponding to the contents transmission request information from the user information database; adding decrypted contents file data corresponding to the contents detail information to the user authentication information and encrypting the adding result; transmitting the encrypted contents file data to the portable device; and updating the contents detail information recorded in the user information database corresponding to the transmitted contents file data.

According to a third aspect of the present invention, there is provided a method for providing data to a portable device via a network, comprising the steps of: receiving encrypted contents file data or a decryption module from a predetermined contents providing server, the decryption module is a module that decrypts the encrypted contents data corresponding to an encryption manner of the contents providing server and has an encrypted file format; monitoring an access of the portable device through a predetermined communication network, and setting a session with the portable device; receiving log in information having user authentication information or contents information to be synchronized from the accessed portable device, the user authentication information includes at least one of a user's identification, password, and portable device identification having a unique value; accessing a predetermined decryption module; decrypting contents file data corresponding to the user authentication information or the contents information included in the log in information through the decryption module; accessing the decrypted contents file data through the authenticated application, and encrypting it through a predetermined encryption module, the encryption module is embodied to operate corresponding to the decryption module of the portable device; and transmitting the encrypted contents file data to the portable device.

According to a third aspect of the present invention, there is provided a server for synchronizing data transmitted to a portable device via a communication network, comprising: a user information database for recording user authentication information or contents detail information that a user uses, the user authentication information includes at least one among a user identification, a password, and the user's portable device identification having unique value; a digital rights management module for transmitting contents information requested by a predetermined user to a contents providing server, for receiving encrypted contents data from the contents providing server, and for decrypting the encrypted contents data through a predetermined decryption module, the decryption module being embodied to operate corresponding to an encryption module of the contents providing server; an encryption module operating corresponding to a predetermined decryption module installed at a portable device for encrypting the decrypted contents data to include user authentication information for the portable device; a security module for monitoring an access to the digital rights management module, judging whether an application to be accessed is an authenticated when the access to the digital rights management module occurs, and passing or intercepting the access of the application to the digital rights management module according to the judged result; and a communication module for transmitting the encrypted file data to the portable device, and for receiving the user authentication information or the contents information requested by the user from the portable device.

According to a fourth aspect of the present invention, there is provided a synchronization server for performing a data synchronization with a portable device via a network, comprising: an encryption module accessing contents data decrypted through a plurality of decryption modules and for adding user authentication information of the portable device to the decrypted contents file data and for encrypting the adding result, the user authentication information includes at least one among a user identification, a password, and the user's portable device identification having unique value; a communication module for transmitting the encrypted contents file data from the encryption module, and for receiving the user authentication information or contents information requested by the user from the portable device, wherein the plurality of decryption packages each include: a digital rights management decryption module for receiving and decrypting file data corresponding to encrypted contents information from the contents providing server; and an application access control module for controlling the access of an application to the digital rights management decryption module, and permitting access to the digital rights management decryption module or the decrypted file data when the application is authenticated.

A portable device widely used in the present invention specification generally means a device that is configured with a predetermined memory means such as a personal digital assistant (PDA), an MP3 player, a handheld PC, an electronic dictionary, a mobile communication device or the like, and that has predetermined calculating ability through a predetermined microprocessor.

BRIEF DESCRIPTION OF THE DRAWINGS

Further objects and advantages of the invention can be more fully understood from the following detailed description taken in conjunction with the accompanying drawings, in which:

FIG. 6 is a flow chart illustrating a method for synchronizing and transmitting contents data to a portable device by a contents synchronization server according to another embodiment of the invention.

DETAILED DESCRIPTION OF THE INVENTION

Hereafter, the preferred embodiments of the present invention will be explained, with reference to the accompanying drawings.

Figure 1:
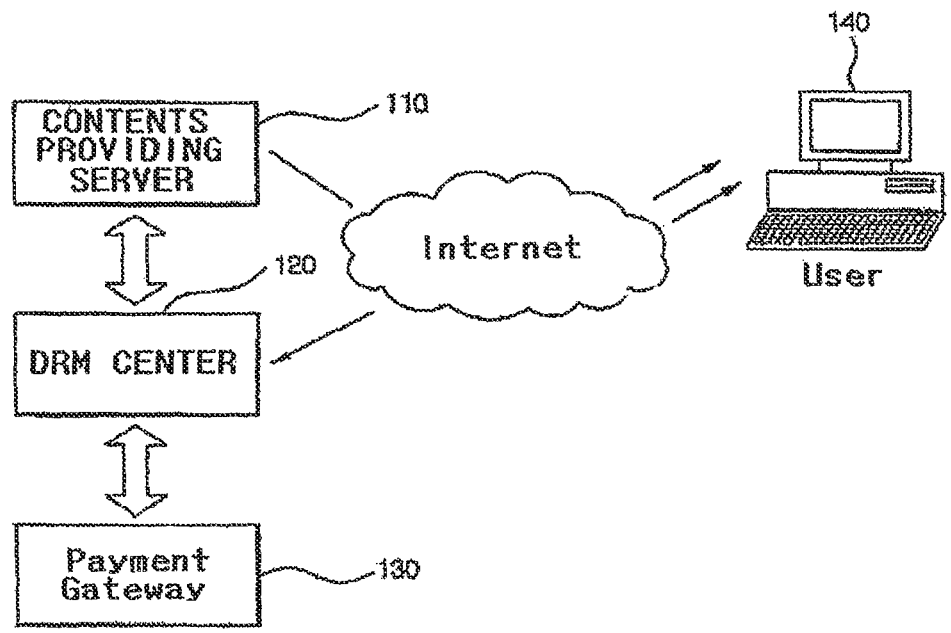
FIG. 1 is a view illustrating a configuration of a conventional system for embodying a method for digital contents protection.
Figure 2:
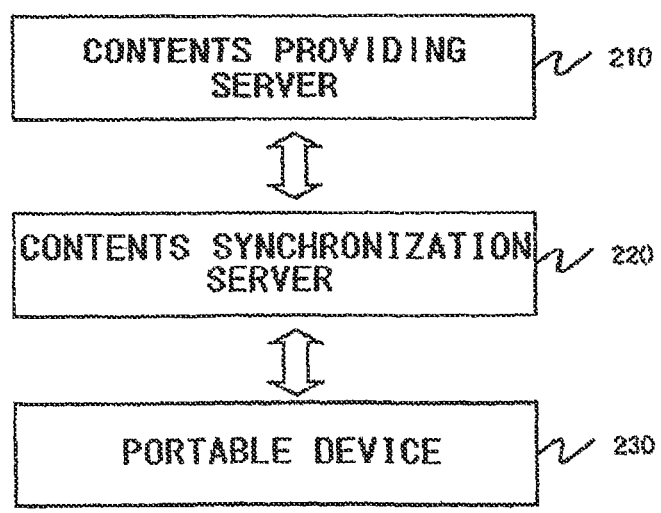
FIG. 2 is a block diagram showing a configuration of a contents providing system according to an embodiment of the present invention.

FIG. 2 is a block diagram showing a configuration of a contents providing system according to an embodiment of the present invention. The contents providing system according to an embodiment of the present invention includes a contents providing server 210, a contents synchronization server 220, and a portable device 230. The contents providing server 210 transmits predetermined encrypted contents file data a decryption module of decrypting the encrypted contents file data provided from a plurality of contents providers, to the contents synchronization server 220. The encrypted contents file data is encrypted through a predetermined digital copyright management module. The decryption module is provided corresponding to at least one encryption module of encrypting the contents data.

The contents synchronization server 220 receives encrypted contents file data or a decryption module corresponding thereto. The decryption module stores files encrypted in a predetermined encryption key. When an access is requested from a predetermined authenticated application through a predetermined driver, the decryption module may decrypt and transmit the encrypted file in real time to the application. The contents synchronization server 220 receives user authentication information or contents information that a user requested from the portable device 230. The contents synchronization server 220 decrypts the encrypted contents data corresponding to the received contents information by a corresponding decryption module. The contents synchronization server 220 encrypts the decrypted contents data including the user authentication information. The contents synchronization server 220 transmits the encrypted contents data to the portable device 230 through a wire communication network or a wireless communication network. The contents synchronization server 220 may use a mobile communication network to which a wireless Internet technique such as WIPI (Wireless Internet Platform Interoperability), WIBRO (Wireless Broadband Internet), or WiMAX as a transmission 10 medium in order to transmit the encrypted contents data to the portable device 230.

The portable device 230 transmits the user the authentication information or the contents information that the user requested to the contents synchronization server 220 through a wire or wireless communication network. The portable device 230 receives the encrypted contents data from the contents synchronization server 220. The portable device 230 decrypts the encrypted contents data through a predetermined decryption module.

Figure 3:
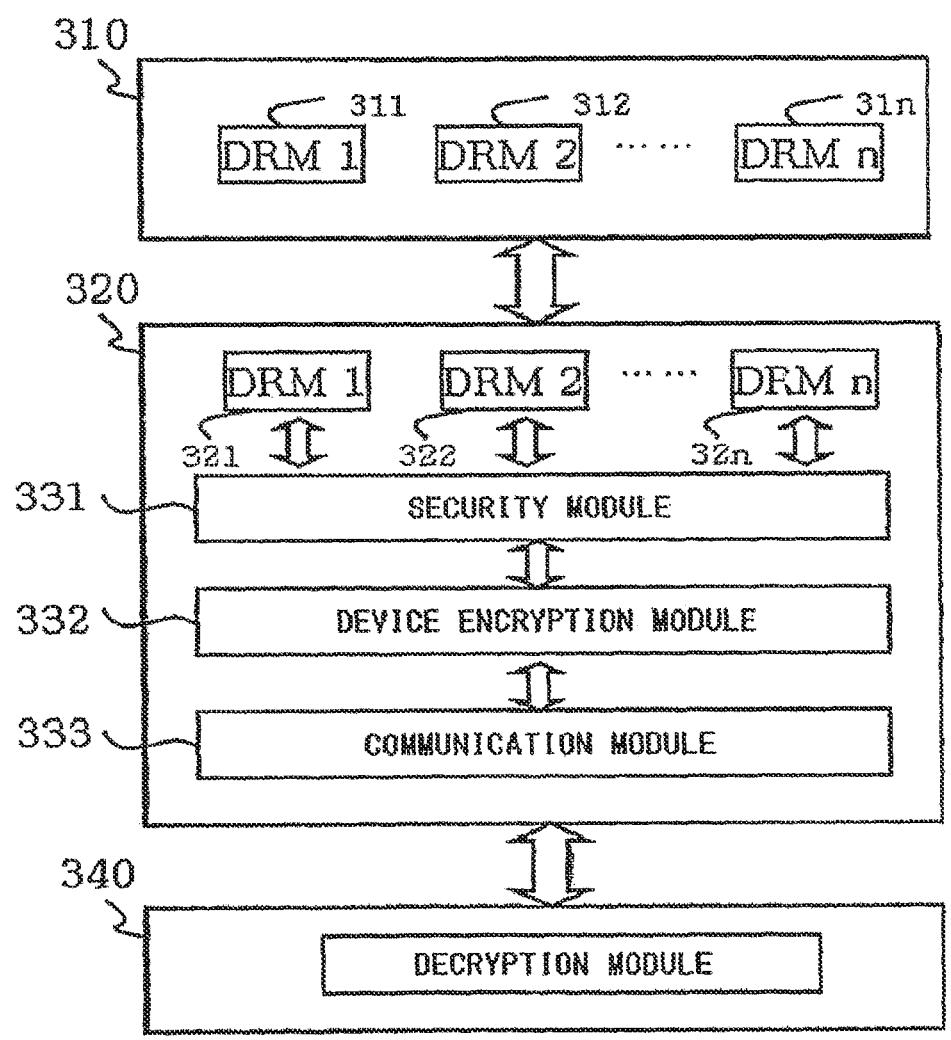
FIG. 3 is a block diagram showing a configuration of a contents synchronization server according to a first embodiment of the present invention.

FIG. 3 is a block diagram showing a configuration of a contents synchronization server according to a first embodiment of the present invention.

With reference to FIG. 3, the contents providing server 310 has a plurality of DRM encryption modules 311 to 31n, and provides the encrypted contents to the contents synchronization server 320 after encrypting the user requesting contents in a respectively different DRM method for each contents provider.

The contents synchronization server 320 receives the encrypted file data corresponding to predetermined contents information from the contents providing server 310 through communication therewith. The contents synchronization server 320 decrypts the received file data and encrypts the decrypted file data so that the same may be usable only in the portable device 340. The contents synchronization server 320 transmits the encrypted file data to the portable device 340. A respectively different encryption method may be applied for each contents provider of the contents providing server 310. Accordingly, the contents synchronization server 320 includes a plurality of DRM decryption modules 311 to 31n to correspond to encryption methods of a plurality of DRM decryption modules 321 to 32n. The plurality of DRM decryption modules 321 to 32n may be upgraded continuously and, if the contents providing server 310 adopts a new DRM method, may decrypt contents which are encrypted in the DRM encryption method by updating the DRM decryption module corresponding to the DRM encryption method.

The contents synchronization server 320 includes a plurality of DRM decryption modules 321 to 32n, a security module 331, a device encryption module 332, and a communication module 333.

The plurality of DRM decryption modules 321 to 32n receive encrypted contents file data provided from the contents providing server 310 or a DRM decryption module decrypting the encrypted contents file data. The plurality of DRM decryption modules 321 to 32n receive encrypted contents file data through a predetermined DRM decryption module. The plurality of DRM decryption modules 321 to 32n operate corresponding to a plurality of DRM decryption modules 321 to 32n that are equipped in the contents providing server 310. This is to decrypt all the encrypted contents that are provided form the contents providing server 310. The plurality of DRM decryption modules 321 to 32n may be embodied into at least one Dynamic Link Library (referred to as 'DLL' hereinafter) file. As described above, the contents synchronization server 320 decrypts the encrypted file data that are provided from the contents providing server 310 is to solve a conventional problem. The portable device 340 in the prior art is required to have a respective decryption module for each encryption method, if encrypted file data have to be decrypted in the portable device 340 or if an encryption method of the file data is different for each contents provider. That is, the contents synchronization server 320 decrypts digital contents which are encrypted into various formats in the contents providing server 310, and transmits the encrypted digital contents to the portable device 340 after encrypting the decrypted digital contents in a predetermined encryption method, whereby the portable device 340 may reproduce the encrypted digital contents through one decryption module.

The security module 331 controls access to the decryption module. Accordingly, if there is any access to the plurality of DRM decryption modules 321 to 32n, the security module 331 determines whether or not the accessing application program is authorized and controls access of the application program to the decryption module, based on the determined result. Herein, access may have all the access to the file such as generate/open/read/write/delete, etc. The security module 331 may control access of the application program. For example, the security module 331 may make a file itself of the decryption module unseen so that an unauthorized application program may not search the plurality of decryption modules 321 to 32n. The security module 331 may control the application program in such a manner that the folder in which the file is stored is searched but not entered. The security module 331 may control the application program in such a manner that application programs other than the application program which is permitted to access the file may not access the file, although the file of the folder is seen. The security module 331 controls only the device encryption module 332 to be accessible to the decrypted contents file data.

The security module 331 monitors all access to an operating system (referred to as 'OS' hereafter) file system through a filter driver of a hooking method and permits the application program which is accessible to the decryption module to access the same. The security module 331 stores the encrypted file in the decryption module by using a predetermined encryption key method and monitors the application program, which wants to access the decryption module, through the filter driver. When the application program is permitted to access, the security module 331 decrypts the encrypted file in real time, and transmits the decrypted file to the application program.

Unless the security module 331 normally operates due to an attack of a malicious program such as a virus program, or self-defect, other program beside the application program that is permitted to access, may access the DRM decryption module without authorization. At this time, the DRM decryption module may be exposed in a type of the encrypted file. However, since a file of the decryption module is itself in the type of the encrypted file, it may be impossible to decrypt the digital encrypted contents normally through the file of the encrypted decryption module.

As indicated previously, although the security module 331 does not normally operate and the file of the encrypted decryption module is accessed without authorization, it is impossible to decrypt the digital encrypted contents unless the file of the encrypted decryption module is decrypted. Therefore, although the digital encrypted contents are copied without authorization, if not decrypted, it may not be used normally.

When a predetermined application program wants to access the DRM decryption module by including predetermined authentication information in the filter driver, the security module 331 transmits the authentication information to the DRM decryption module, and performs authentication, wherein the filter driver operates when accessing the decryption module. At this time, when the application program is authenticated, the security module 331 may allow it to access the DRM decryption module.

In order to maintain the security of the decryption data, the security module 331 may prevent access of other application program to a memory in which the decrypted data are stored, unless it is a case in which the device encryption module 332 encrypts the decrypted data. When applications other than the encryption module accesses the decrypted file data, the decrypted file data may be copied without authorization and distributed or used illegally. Therefore, this is one solution for preventing the aforementioned problems. The security module 331 allows the file data managed in respective DRM decryption modules to be accessible only through a kernel level of an Operating System (OS), whereby the security module 331 can control other application program in such a manner that the decrypted file data may not be usable in other application program.

The device encryption module 332 accesses and encrypts the decrypted file data so that the file data may be usable only in the predetermined portable device. The device encryption module 332 may operate corresponding to the decryption module of the portable device 340, and encrypt the user authentication information of the portable device 340 in the decrypted file data by using an encryption key. The device encryption module 332 may encrypt corresponding contents using a predetermined authentication key or certificate for encryption of the contents that is transmitted to the portable device 340.

The communication module 333 transmits the encrypted file data to the portable device 340 over a predetermined wire communication network or wireless communication network. Further, the communication module 333 receives the user authentication information or the contents information that the user requested from the portable device 340. The contents information includes information the contents that the user wants to use. A wireless Internet technique such as WIPI (Wireless Internet Platform Interoperability), WIBRO (Wireless Broadband Internet), or WiMAX may be applied as the communication module 333.

The portable device 340 receives the encrypted file data from the contents synchronization server 320 coupled therewith through the wire or wireless communication network, and decrypts the received file data through a predetermined decryption module. A wireless Internet technique such as WIPI (Wireless Internet Platform Interoperability), WIBRO (Wireless Broadband Internet), or WiMAX mobile communication network may be used as the portable device 340. The decryption module is embodied to operate corresponding to the device encryption module 332 of the contents synchronization server 320. The decryption module may decrypt the encrypted file data by using the corresponding user authentication information of the portable device 340, wherein the file data is encrypted in the device encryption module 332 of the contents synchronization server 320.

Figure 4:
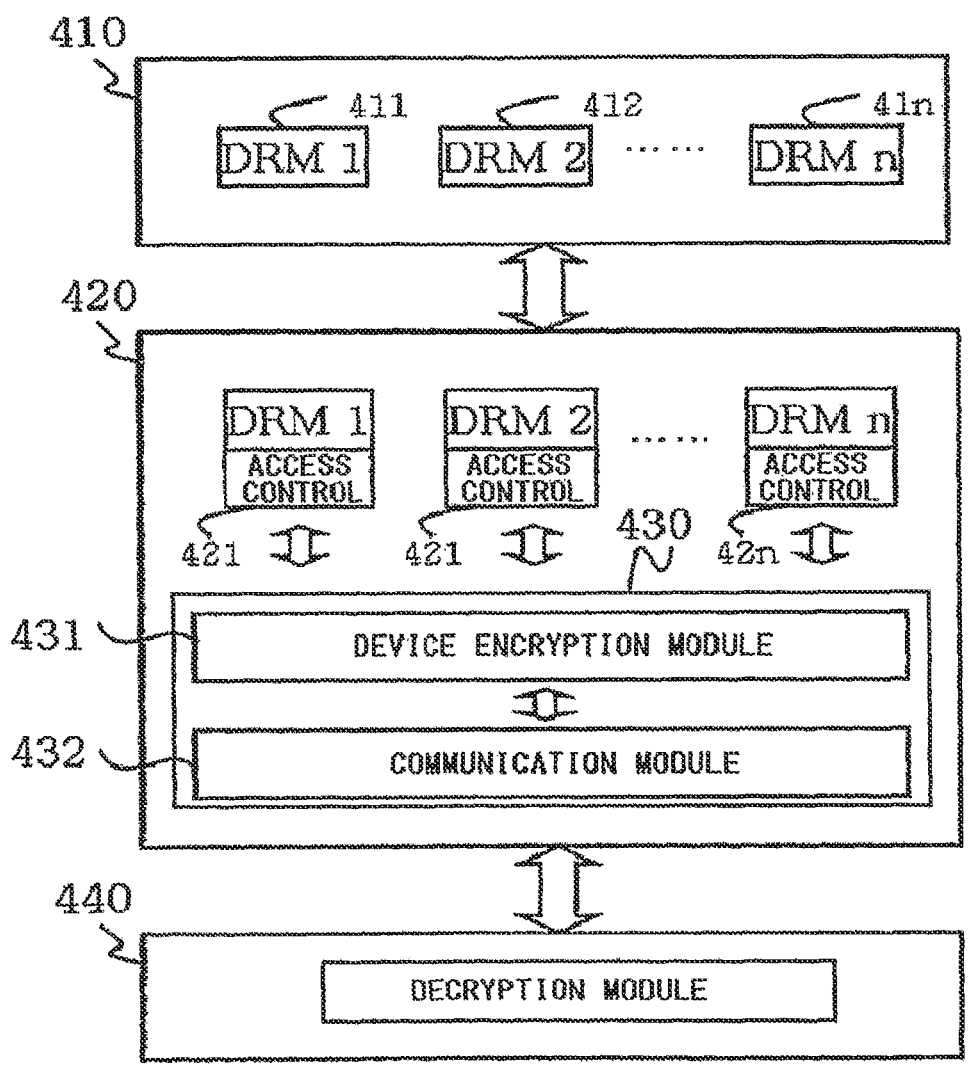
FIG. 4 is a block diagram showing a configuration of a contents synchronization server according to a second embodiment of the present invention.

FIG. 4 is a block diagram showing a configuration of a contents synchronization server according to a second embodiment of the present invention.

Referring to FIG. 4, the contents providing server 410 includes a plurality of DRM encryption modules 411 through 41 n, and provides user requested contents to the contents synchronization server 420 after encrypting the contents in a respectively different DRM method for each contents provider.

The contents synchronization server 420 may comprise a plurality of decryption packages 421 to 421n and a device decryption package 430. The plurality of decryption packages 421 to 421n receive encrypted contents file data corresponding to predetermined contents information from the contents providing server 410 through communication with the contents providing server 410. The plurality of decryption packages 421 to 421n may comprise a DRM decryption module and an application access control module. The DRM decryption module decrypts the encrypted contents file data provided from each contents providing server 210. The application access control module controls an application that accesses the DRM decryption module or the file data decrypted in the DRM decryption module.

A respectively different encryption method may be applied for each contents provider of the contents providing server 410. Therefore, the DRM decryption module may be designed to perform at least one decryption module. This is so that the DRM decryption module may correspond to encryption methods of DRM modules 411 to 411n. Whenever there is an advent of a new DRM method, the DRM decryption module may be continuously updated and, if the contents providing server 410 adopts the new DRM method, may decrypt the corresponding contents through upgrading. The DRM decryption module operates corresponding to a plurality of DRM encryption modules 411 to 41n of the contents providing server 410. This is so that the DRM decryption module may decrypt all the encrypted contents that are provided from the contents providing server 410. As described above, the plurality of decryption packages 421 decrypt the encrypted file data which is provided from the contents providing server 410 to solve the problem in the prior art. If the portable device 440 decrypts the file data or if an encryption method of the file data is different for each contents provider, the portable device 440 in the prior art is required to have a respective decryption method for each encryption method. That is, a plurality of decryption packages 421 to 42n decrypt digital contents that are encrypted into various formats in the contents providing server 410 and transmits the digital encrypted contents to the portable device 440 after encrypting the digital decrypted contents in an encryption method corresponding to the portable device 440 in the plurality of decryption packages 421 to 42n, whereby the portable device 440 may reproduce the digital encrypted contents through one decryption module.

The application access control module permits/prevents the application's access to the DRM decryption module or to the file data that has been decrypted therein, based on whether or not the contents providing server 410 that requests the file data is an authenticated application. If a device synchronization package 430 is an authenticated application, the application access control module permits the device synchronization package 430 to access the DRM decryption module or to access the file data, wherein the file data is decrypted through the DRM decryption module. The application access control module monitors the application's request for access to the decrypted file data or the application's access to the DRM decryption module itself, wherein the application operates in the device synchronization package 430. If there is a request for access to the decrypted file data or if there is access to the DRM decryption module, the application access control module determines whether or not the application is authenticated and enables the application to access the decrypted file data or the DRM decryption module, based on the determined result.

The file data decrypted through the DRM decryption module is transmitted to the device synchronization package 430. This is one solution for preventing unauthorized copy and illegal distribution. Because, if other application besides the device synchronization package 430 according to the present invention is accessible to the decrypted file data or the DRM module, the decrypted file data may be copied without authorization and distributed or used illegally.

The device synchronization package 430 may include a device encryption module 431 and a communication module 432. The device synchronization package 430 accesses the decrypted filed data and encrypts the same through the device encryption module 431, and transmits the encrypted file data to the communication module 432, wherein the file data include user authentication information of the portable device. The user authentication information may include at least one among a user ID, a password, and the user's portable device ID—the portable device ID has unique value. This device ID may be a product ID of the corresponding portable device.

The device encryption module 431 accesses the file data, which is decrypted from the decryption packages 421 to 42n, through a predetermined application and encrypts the decrypted file data so that the file data may be usable only in the predetermined portable device. The device synchronization module 431 may operate corresponding to the decryption module of the portable device 440, and encrypt user authentication information of the portable device 440 in the decrypted file data by using the encryption key. The device encryption module 431 may be configured to encrypt the contents using the predetermined authentication key or certificate. This is for encryption of the contents that are transmitted to the portable device 440.

The communication module 432 transmits the encrypted file data to the portable device 440, and receives the user authentication information or the user requesting contents information from the portable device 440. When the communication module 432 transmits the encrypted contents file data to the portable device, a wireless Internet technique such as WIPI (Wireless Internet Platform Interoperability), WIBRO (Wireless Broadband Internet), or WiMAX is applicable thereto. The contents information includes information on contents that the user wants to use.

The portable device 440 receives the encrypted file data from the contents synchronization server 420, and decrypts the received file data through the predetermined decryption module. The decryption module operates corresponding to the device encryption module 431 of the device synchronization package 430. The decryption module may decrypt file data by using the corresponding user authentication information of the portable device 440, wherein the file data is encrypted in the device encryption module 431 of the device synchronization package 430.

As described above, when the decrypted contents in the synchronization device are re-encrypted through the predetermined encryption method before being transmitted to the portable device, contents that are transmitted to the portable device are encrypted once more. Therefore, digital right may be protected more strongly. Namely, when contents data that is transmitted between the synchronization device and the portable device are not encrypted, the corresponding contents may be copied without authorization through a plurality of portable devices. It is because the portable device is currently used as mass storage. Therefore, digital right of the corresponding contents may be protected through prevention of the unauthorized copy.

Figure 5:
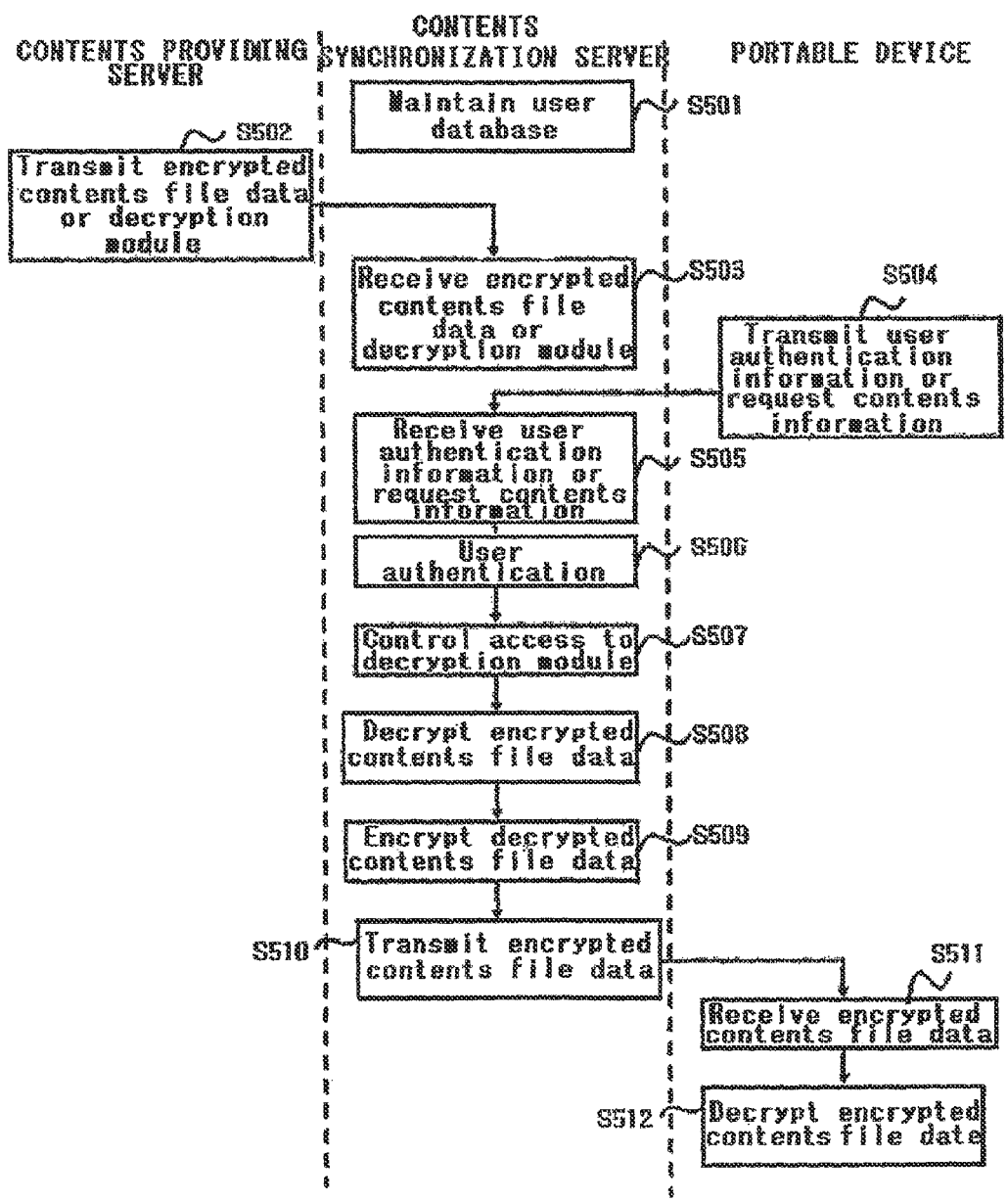
FIG. 5 is a flow chart illustrating a method for synchronizing and transmitting contents data to a portable device by a contents providing system according to an embodiment of the invention.

FIG. 5 is a flow chart illustrating a method for synchronizing and transmitting contents data to a portable device by a contents providing system according to an embodiment of the invention.

In step S501, a contents synchronization server maintains a user information database for recording user authentication information or user contents information. The user authentication information includes at least one among a user ID, password, and portable device ID, wherein the portable device ID has a unique value. The user contents detail information includes information on contents that the user wants to use in the portable device.

In step S502, the contents providing server transmits encrypted contents file data or a decryption module for decrypting the encrypted contents file data to the contents synchronization server. The decryption module is a module that decrypts the encrypted contents data corresponding to an encryption manner of the contents providing server.

In step S503, the contents synchronization server receives the encrypted contents file data or the decryption module for decrypting the encrypted contents file data from a predetermined contents providing server. The encrypted contents file data are data that are encrypted through a predetermined digital copyright management module. The decryption module is provided corresponding to at least one encryption module of encrypting the contents file data.

In step S504, a portable device transmits user authentication information or request contents information to the contents synchronization server. The request contents information includes contents information transmitted from the user. The portable device may transmit the user authentication information or the request contents information to the contents synchronization server using a mobile communication network to which a wireless Internet technique such as WIPI (Wireless Internet Platform Interoperability), WIBRO (Wireless Broadband Internet), or WiMAX is applied as a transmission medium.

In step S505, the contents synchronization server receives the user authentication information or the request contents information from a predetermined portable device.

In step S506, the contents synchronization server searches the user information database to authenticate a user by using the user authentication information.

In step S507, the contents synchronization server controls an access to a predetermined decryption module so as to decrypt the encrypted contents file data. This control is in order to prevent users or applications other than authenticated users or applications from accessing the decryption module to decrypt the encrypted contents file data.

In step S508, the contents synchronization server decrypts the encrypted contents file data through the accessed decryption module.

In step S509, the contents synchronization server encrypts the decrypted contents file data corresponding to the contents information using the user authentication information. The reason of encrypting the decrypted contents file data using the user authentication information is that only authenticated users can use the encrypted contents in order to maintain the security of contents in the portable device.

In step S510, the contents synchronization server transmits the encrypted contents file data to the user's portable device according to the request contents information. The contents synchronization server may update the contents detail information recorded in the user information database corresponding to the transmitted contents file data.

In step S511, the portable device receives the encrypted contents file data transmitted from the contents synchronization server. In step S512, the portable device decrypts the encrypted contents file data through a predetermined decryption module. The decryption module of the portable device is a module that decrypts the encrypted contents file data in the encryption module corresponding to an encryption module of the contents synchronization server.

FIG. 6 is a flow chart illustrating a method for synchronizing and transmitting contents data to a portable device by a contents synchronization server according to another embodiment of the invention.

With reference to FIG. 6, in step S610, the contents synchronization server receives encrypted contents file data or a decryption module from a predetermined contents providing server. At this time, the encrypted contents file data is encrypted through a predetermined digital copyright management module. The decryption module is provided corresponding to at least one encryption module that encrypts the contents file data. The decryption module stores the encrypted file in a predetermined encryption key. Furthermore, when a predetermined authenticated application requests access to the encrypted file through a predetermined driver, the decryption module decrypts and transmits the encrypted file to the predetermined authenticated application in real time.

In step S620, the contents synchronization server monitors an access of the portable device through a predetermined communication network, and sets a session with the portable device.

In step S630, the content synchronization server receives log in information having user authentication information or contents information to be synchronized from the accessed portable device. The user authentication information includes at least one of a user's ID, password, and portable device ID, wherein the portable device ID has a unique value.

In step S640, the contents synchronization server accesses a predetermined decryption module so as to decrypt the encrypted file data according to the log in information. The access of the decryption module is possible only by authenticated users or applications. The decryption module is in an encrypted state as a module for decrypting the encrypted contents file data corresponding to an encryption manner of the contents providing server that has provided the encrypted contents file data.

In step S650, the contents synchronization server decrypts contents file data corresponding to the user authentication information or the contents information included in the log in information through the decryption module.

In step S660, the contents synchronization server accesses the decrypted contents file data through the authenticated application, and encrypts it through a predetermined encryption module. The encryption module is embodied to operate corresponding to the decryption module of the portable device.

In step S670, the contents synchronization server transmits the encrypted contents file data to the portable device. The portable device receives the encrypted contents file data, and decrypts and uses the received contents file data through a decryption module.

The embodiments of the present invention may include computer readable media having program instructions to implement various operations embodied by a computer. The computer readable media may also include, alone or in combination with the program instructions, data files, data structures, tables, and the like. The computer readable media and the program instructions may be those specially designed and constructed for the purposes of the present invention, or they may be of the kind well known and available to those having skill in the computer software arts. Examples of computer-readable media include magnetic media such as hard discs, floppy discs, and magnetic tapes; optical media such as CD-ROM discs; magneto-optical media such as floptical disks; and hardware devices that are specially configured to store and perform program instructions, such as read-only memory (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

While the present invention has been described with reference to several preferred embodiments, the description is illustrative of the invention and is not construed as limiting the invention. Various modifications and variations may occur to those skilled in the art, without departing from the scope and spirit of the invention, as defined by the appended claims.

Industrial Applicability

According to the present invention, a method for providing data synchronized with a portable device to the portable device via a network and a system thereof, may provide a method of decrypting digital contents encrypted into various formats in one contents synchronization server and of transmitting the digital contents to a portable device.

Further, according to the present invention, the method for providing data synchronized with a portable device to the portable device via a network and the system thereof, may decrypt digital contents encrypted into various formats in one contents synchronization server and transmit the digital encrypted contents to the portable device after encrypting the digital decrypted contents in a predetermined DRM method. In addition, the method and the system allow the portable device to reproduce the digital encrypted contents through one decryption module. Therefore, the present invention may protect digital right more strongly and support the DRM method of various formats.

Furthermore, according to the present invention, the method for providing data synchronization with a portable device via a network and the system thereof, may enable at least one digital contents to be transmitted from at least one contents providing system if there is one connection through one contents synchronization server. Therefore, the present invention may reduce the inconvenience of a user who should input a user ID and a password separately in the conventional contents providing systems and enable the user to receive digital contents which the user wants to us through one logic channel.

Moreover, in accordance with the present invention, the method and the system may decrypt digital contents encrypted into various formats in one contents synchronization server, encrypt the digital decrypted contents so that the same is usable only in a predetermined portable device, and transmit the digital encrypted contents to the portable device, wherein the portable device is enabled to reproduce the digital encrypted contents through one decryption module. Therefore, the present invention may protect digital rights more strongly and support the DRM method of various formats.

In addition, in accordance with the present invention, the method and the system may be accessible only when digital contents encrypted into various formats are decrypted in one contents synchronization server and the digital decrypted contents are encrypted. Therefore, the present invention may prevent unauthorized copy of digital contents which may be caused by unauthorized access to decrypted file data.

The invention claimed is:

1. A method for providing data to a portable device via a network, comprising the steps of:
   maintaining a user information database;
   receiving data that includes encrypted content and a decryption module from a content providing server, the decryption module being for decrypting the encrypted content according to an encryption manner of the content providing server;
   re-encrypting at least a part of the received data into a format that the portable device can decrypt;
   transmitting the re-encrypted data to the portable device, wherein the portable device decrypts the encrypted content using the re-encrypted data, and plays the decrypted content; and
   receiving user authentication information for authenticating a user corresponding to the user authentication information with reference to the user information database from the portable device,
   wherein the re-encrypting comprises re-encrypting at least a part of the received data into the format that the portable device can decrypt, including the user authentication information for the portable device.

2. The method according to claim 1, wherein the encrypted content is re-encrypted using one or more digital rights managements (DRMs) in the content providing server.

3. The method according to claim 2, further comprising:
   decrypting the con tent encrypted using the one or more DRMs.

4. The method according to claim 3, wherein the decrypting comprises decrypting using a plurality of decryption modules corresponding to the one or more DRMs.

5. The method according to claim 1, wherein the re-encrypting comprises decrypting using a plurality of encryption modules corresponding to a plurality of DRMs.

6. The method according to claim 1, wherein the user information database includes information of content purchased by a user.

7. The method according to claim 6, further comprising:
   updating the information of the purchased content after the transmitting, 8. The method according to claim 3, further comprising:
   controlling an access to a predetermined decryption module for decrypting the encrypted content.

9. The method according to claim 8, wherein the decrypting comprises decrypting the encrypted content through the accessed decryption module.

10. An apparatus for providing data to a portable device via a network, comprising:
    a storage device for a user information database for maintaining a user information;
    a digital rights management(DRM) unit to receive data that includes encrypted content and a decryption module from a content providing server, the decryption module being for decrypting the encrypted content according to an encryption manner of the content providing server;

an encryption unit to re-encrypt at least a part of the received data into a format that the portable device can decrypt; and a communication unit to transmit the re-encrypted data to the portable device, wherein the portable device decrypts the encrypted content using the re-encrypted data, and plays the decrypted content, wherein the communication unit receives user authentication information for authenticating a user corresponding to the user authentication information with reference to the user information database from the portable device, and wherein the encryption unit re-encrypts at least a part of the received data into the format that the portable device can decrypt, including the user authentication information for the portable device.

11. The apparatus according to claim 10, wherein the encrypted content is re-encrypted using one or more digital rights managements (DRMs) in the content providing server.

12. The apparatus according to claim 11, wherein the decryption module decrypts the content encrypted using the one or more DRMs.

13. The apparatus according to claim 12, wherein the decryption module uses a plurality of decryption modules corresponding to the one or more DRMs.

14. The apparatus according to claim 10, wherein the encryption unit uses a plurality of encryption modules corresponding to a plurality of DRMs.

15. The apparatus according to claim 10, wherein the user information database includes information of content purchased by a user.

16. The apparatus according to claim 15, wherein the information of the purchased content is updated after the transmitting.

17. The apparatus according to claim 11, further comprising:

a security module to control an access to a predetermined decryption module for decrypting the encrypted content.

18. The apparatus according to claim 17, wherein the accessed decryption module decrypts the encrypted content.

* * * * *